United States Patent
Takei

(10) Patent No.: US 8,044,621 B2
(45) Date of Patent: Oct. 25, 2011

(54) MOTOR CONTROLLER

(75) Inventor: Yasuyuki Takei, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 286 days.

(21) Appl. No.: 12/483,123

(22) Filed: Jun. 11, 2009

(65) Prior Publication Data
US 2009/0251087 A1 Oct. 8, 2009

Related U.S. Application Data

(63) Continuation of application No. PCT/JP2008/053619, filed on Feb. 29, 2008.

(30) Foreign Application Priority Data

Mar. 7, 2007 (JP) ................................. 2007-057223

(51) Int. Cl.
H02P 6/10 (2006.01)

(52) U.S. Cl. ............... 318/400.23; 318/400.01; 318/700

(58) Field of Classification Search ............. 318/400.01, 318/400.23, 700
See application file for complete search history.

(56) References Cited

U.S. PATENT DOCUMENTS

| | | | |
|---|---|---|---|
| 5,668,458 A * | 9/1997 | Ueda et al. ................ | 318/716 |
| 2002/0041168 A1* | 4/2002 | Mann et al. ................ | 318/254 |
| 2003/0169015 A1* | 9/2003 | Royak et al. ............... | 318/727 |
| 2004/0079173 A1* | 4/2004 | Neely et al. ............... | 73/862.333 |
| 2005/0073280 A1* | 4/2005 | Yoshinaga et al. ......... | 318/727 |
| 2005/0146306 A1* | 7/2005 | Ha et al. .................... | 318/807 |
| 2005/0231143 A1* | 10/2005 | Yoshinaga et al. ......... | 318/254 |
| 2006/0038531 A1* | 2/2006 | Wakabayashi et al. ..... | 318/807 |
| 2006/0132082 A1* | 6/2006 | Ihm et al. ................... | 318/717 |
| 2006/0208683 A1* | 9/2006 | Ide ............................. | 318/609 |
| 2009/0237014 A1* | 9/2009 | Yamada ..................... | 318/400.02 |
| 2010/0244755 A1* | 9/2010 | Kinugasa et al. .......... | 318/400.23 |
| 2010/0286870 A1* | 11/2010 | Endo et al. ................. | 701/41 |

FOREIGN PATENT DOCUMENTS

| JP | 2001-352791 | 12/2001 |
|---|---|---|
| JP | 2003-088159 | 3/2003 |

* cited by examiner

Primary Examiner — Walter Benson
Assistant Examiner — Kawing Chan
(74) Attorney, Agent, or Firm — Ditthavong Mori & Steiner, P.C.

(57) ABSTRACT

A motor controller supplies power to a motor and drives the motor, the motor including a position detector. The motor controller includes a velocity control unit which generates a torque instruction by using a velocity instruction and a velocity signal; a correction processing unit which Fourier-transforms the torque instruction, extracts first-, second-, and sixth-order frequency components from the Fourier-transformed torque instruction, extracts an order component having the largest spectrum from the extracted order components, and generates a sine wave correction signal; an adder which adds the sine wave correction signal to the torque instruction, and generates a new torque instruction; and a position-signal generation unit which generates a position signal by using a position detection signal of the position detector.

5 Claims, 3 Drawing Sheets

MOTOR CONTROLLER

CROSS-REFERENCES TO RELATED APPLICATION

The present application is related to PCT patent application Ser. No. PCT/JP2008/053619 titled "Motor Controller and Motor and Torque Ripple Correction Method", and to Japanese Patent application No. 2007-057223 filed at Japan Patent Office titled "Motor Controller and Motor and Torque Ripple Correction Method", all of which are incorporated herein by reference.

BACKGROUND OF THE INVENTION

1. Field of the Invention

The present invention relates to a motor controller for correcting torque ripple caused by a motor or a motor controller and generating smooth torque.

2. Description of Related Art

To control the velocity of a motor having torque ripple, a motor controller can reduce velocity fluctuation resulting from the torque ripple by increasing a velocity loop gain. The velocity fluctuation, however, may not be reliably reduced when the velocity loop gain is low, which has to be addressed.

For example, Japanese Unexamined Patent Application Publication No. 2003-88159 discloses a torque ripple correction apparatus for a synchronous AC motor. The apparatus generates a sine wave signal in accordance with an electrical angle of the synchronous AC motor, and adds the sine wave signal to a torque instruction, as a correction value Tcmp. In particular, the motor is operated at a constant velocity, the torque instruction and electrical angle of the motor are measured and accumulated in a buffer for a given period, the accumulated data is Fourier-transformed to extract first- to m-th-order components for the electrical angle, the extracted data is inverse-Fourier-transformed to generate a sine wave correction signal, and a correction unit adds the generated signal to the torque instruction, thereby correcting the torque ripple.

For another example, Japanese Unexamined Patent Application Publication No. 2001-352791 controls a synchronous motor using phase current, the phase current being obtained by multiplying sine wave current by a current correction coefficient K, the current correction coefficient K being calculated as the sum of even harmonics of the number of phases of current control frequency of the synchronous motor. A coefficient of each even harmonics term in an operation expression of the current correction coefficient K is obtained by inverting a polarity with a rate corresponding to the average torque of frequency components calculated by Fourier-transforming a torque fluctuation waveform when the synchronous motor is controlled with the sine wave current. The phase of a current value I of each of the even harmonics is obtained as the phase of frequency component calculated by Fourier-transforming the torque fluctuation waveform. The torque fluctuation can be reduced by using the current correction coefficient K because the torque fluctuation component in the even harmonics of the number of phases appears greatly by the Fourier transform of the torque fluctuation when control is performed by the sine wave current.

SUMMARY OF THE INVENTION

According to an aspect of the invention, a motor controller supplies power to a motor and drives the motor, the motor including a position detector. The motor controller includes a velocity control unit which generates a torque instruction by using a velocity instruction and a velocity signal; a correction processing unit which Fourier-transforms the torque instruction, extracts first-, second-, and sixth-order frequency components from the Fourier-transformed torque instruction, extracts an order component having the largest spectrum from the extracted order components, and generates a sine wave correction signal; an adder which adds the sine wave correction signal to the torque instruction, and generates a new torque instruction; and a position-signal generation unit which generates a position signal by using a position detection signal of the position detector.

According to another aspect of the invention, a torque ripple correction method includes the steps in which an electrical-angle generation unit generates an electrical angle by using a position signal (step 1), a trace unit accumulates a torque instruction for a given period (step 2), a Fourier transform unit Fourier-transforms the accumulated torque instruction data (step 3), the Fourier transform unit extracts first-, second-, and sixth-order frequency components from the Fourier-transformed torque instruction data, the first-order component corresponding to a single cycle of an electrical angle (step 4), an order-component extraction unit extracts an order having the largest spectrum from the Fourier-transformed first-, second-, and sixth-order components, then a correction-signal generation unit inverse-Fourier-transforms the torque instruction component of the extracted frequency and generates a sine wave correction signal (step 5), an adder adds the sine wave correction signal to the torque instruction and generates a new torque instruction (step 6), and a correction processing unit checks whether the extracted torque instruction components for all orders are corrected (step 7). If the torque instruction components for all orders are not corrected, the processing from step 1 is repeated. In contrast, if the extracted torque instruction components for all orders are corrected, the correction operation is ended.

In the above configuration, when the processing from step 1 to step 7 is repeated a predetermined number of times, a previous sine wave correction signal and a current sine wave correction signal may be synthesized to generate a new sine wave correction signal. The new sine wave correction signal may be added to the torque instruction to generate a new torque instruction.

BRIEF DESCRIPTION OF THE DRAWINGS

Exemplary embodiments of the present invention will be described in detail based on the following figures, wherein.

DETAILED DESCRIPTION OF THE PREFERRED EMBODIMENTS

Embodiments of the invention will be described below with reference to the attached drawings.

Figure 1:
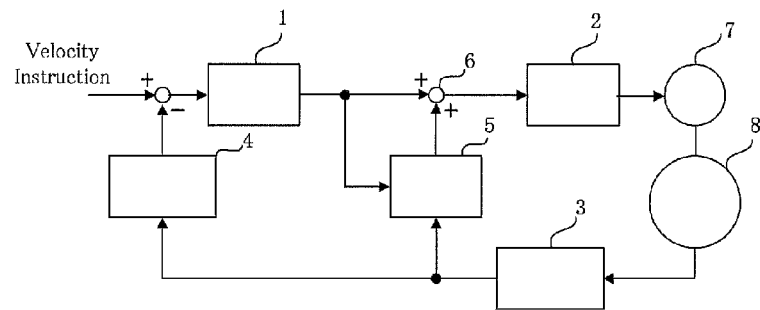
FIG. 1 is a block diagram showing a configuration of a motor controller according to a first embodiment of the invention.

FIG. 1 is a block diagram showing a configuration of a motor controller according to a first embodiment of the invention. In FIG. 1, the motor controller of this embodiment includes a velocity control unit 1, a motor drive unit 2, a position-signal generation unit 3, a velocity-signal generation unit 4, a correction processing unit 5, and an adder 6. The motor controller drives a motor 7 provided with a position detector 8.

The velocity control unit 1 generates a torque instruction by processing the difference between a velocity instruction and a velocity signal with PID control. The motor drive unit 2 converts the torque instruction into a current instruction, generates a voltage instruction by processing the difference between the current instruction and a current signal with PID control, generates a PWM signal by using the voltage instruction, drives a power converter, and supplies the motor 7 with a voltage.

The position detector 8 detects the position of the motor 7 and generates a position detection signal.

The position-signal generation unit 3 generates a position signal by using the position detection signal.

The velocity-signal generation unit 4 generates a velocity signal by using a time difference of the position signal. The correction processing unit 5 generates a sine wave correction signal by using the torque instruction signal and the position signal.

Figure 2:
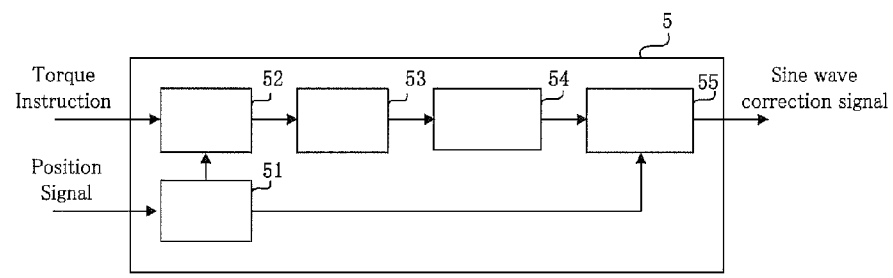
FIG. 2 is a block diagram showing a configuration of a correction processing unit in the motor controller of the first embodiment of the invention.

FIG. 2 is a block diagram showing a configuration of the correction processing unit in the motor controller of the first embodiment of the invention. In FIG. 2, the correction processing unit 5 includes an electrical-angle generation unit 51, a trace unit 52, a Fourier transform unit 53, an order-component extraction unit 54, and a correction-signal generation unit 55.

The electrical-angle generation unit 51 generates an electrical angle of the motor 7 by using the position signal generated by the position-signal generation unit 3. The trace unit 52 stores the torque instruction in accordance with the electrical angle.

The Fourier transform unit 53 Fourier-transforms the stored torque instruction, such that a frequency corresponding to a single cycle of the electrical angle is determined as a first order, a double frequency is determined as a second order, and a six-fold frequency is determined as a sixth order.

The order-component extraction unit 54 extracts a frequency having the largest spectrum from the first-, second-, and sixth-order Fourier transform results.

The correction-signal generation unit 55 generates a sine wave correction signal by inverse-Fourier-transforming the torque instruction component of the extracted frequency.

Next, a torque ripple correction method in the correction processing unit of the motor controller according to the embodiment of the invention will be described.

Figure 4:
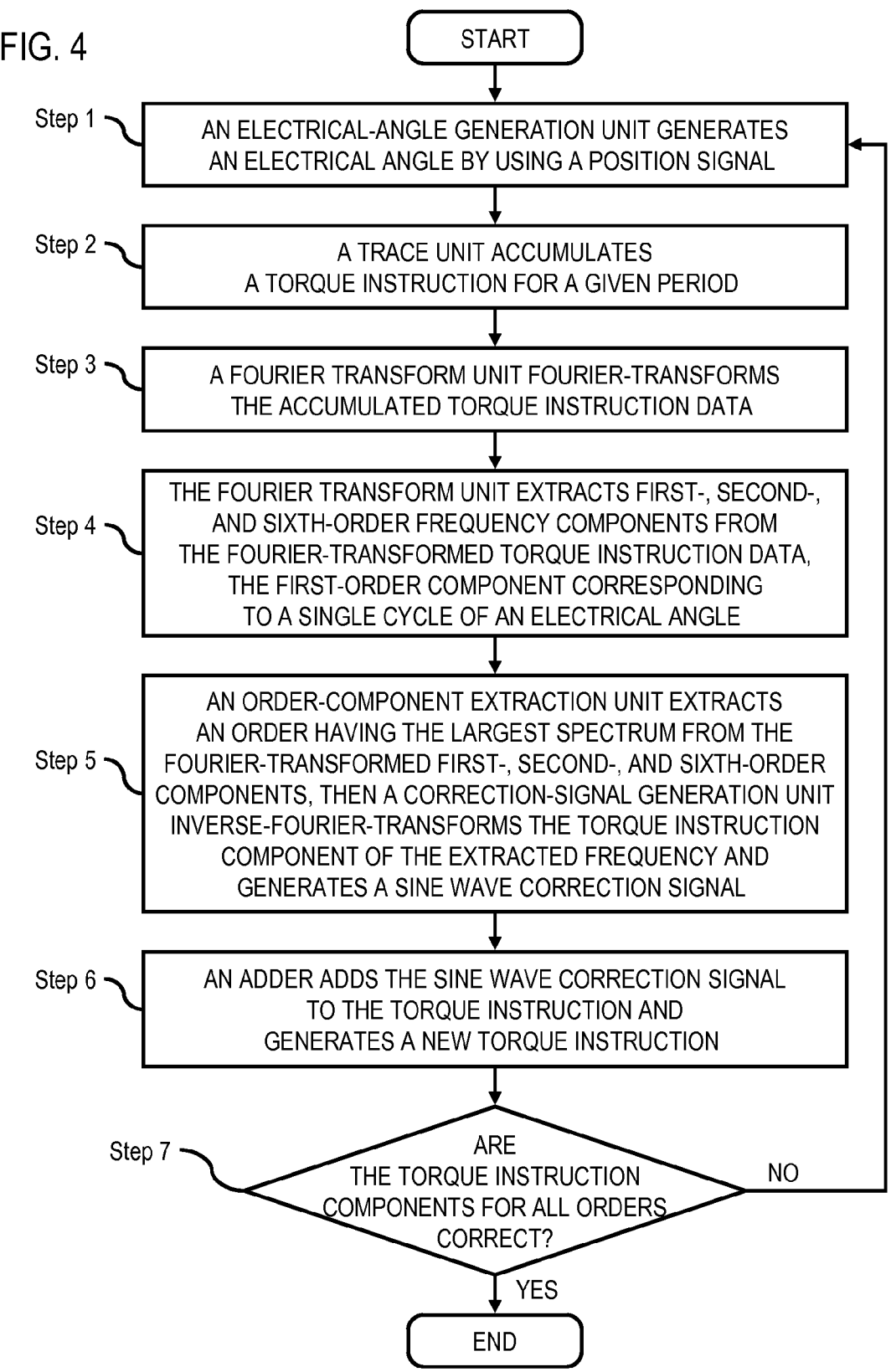
FIG. 4 is a flowchart showing a torque ripple correction method according to an embodiment of the invention.

The torque ripple correction method shown in FIG. 4 includes the steps in which the electrical-angle generation unit 51 generates an electrical angle by using a position signal (step 1), the trace unit 52 accumulates a torque instruction for a given period (step 2), the Fourier transform unit 53 Fourier-transforms the accumulated torque instruction data (step 3), the Fourier transform unit 53 extracts first-, second-, and sixth-order frequency components from the Fourier-transformed torque instruction data, the first-order component corresponding to a single cycle of an electrical angle (step 4), the order-component extraction unit 54 extracts an order having the largest spectrum from the Fourier-transformed first-, second-, and sixth-order components, then the correction-signal generation unit 55 inverse-Fourier-transforms the torque instruction component of the extracted frequency and generates a sine wave correction signal (step 5), the adder 6 adds the sine wave correction signal to the torque instruction and generates a new torque instruction (step 6), and the correction processing unit 5 checks whether the torque instruction components for all orders are corrected (step 7). If the extracted torque instruction components for all orders are not corrected, the processing from step 1 is repeated. In contrast, if the extracted torque instruction components for all orders are corrected, the correction operation is ended.

Figure 5:
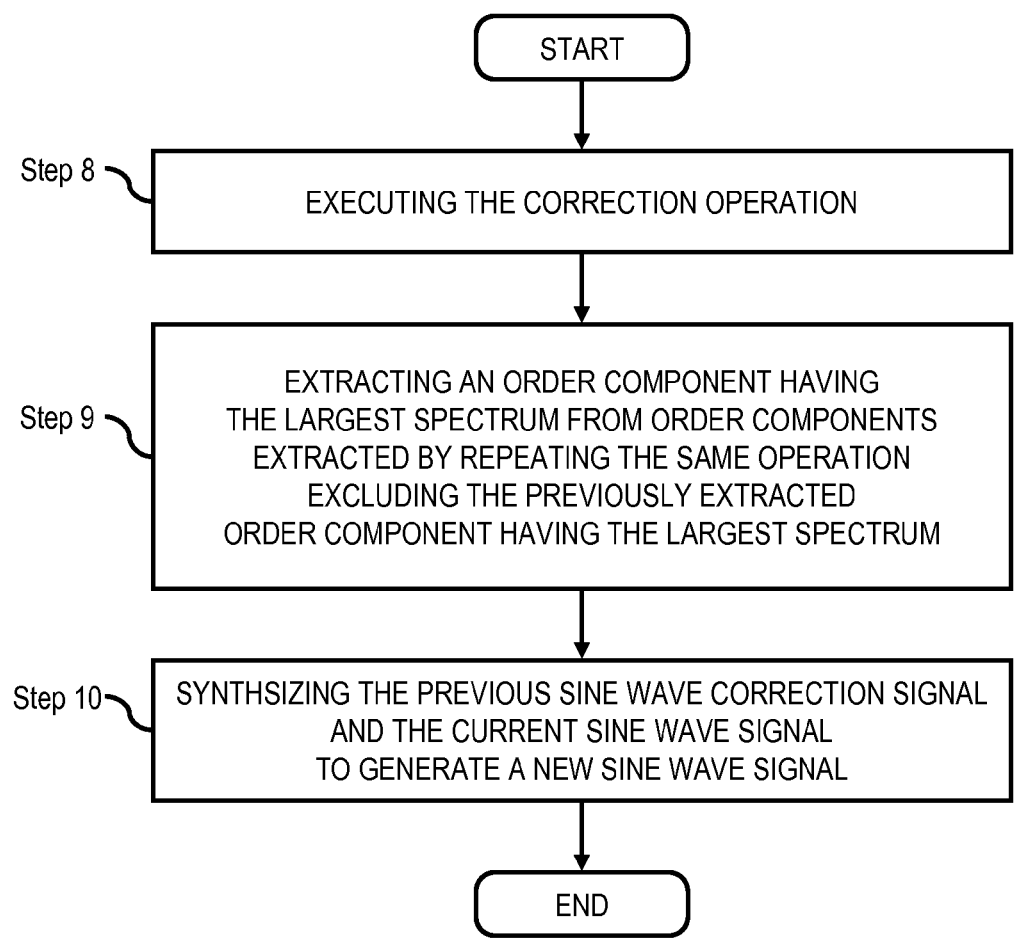
FIG. 5 is a flowchart showing a method for generating a new sine wave correction signal according to an embodiment of the invention.

When the processing from step 1 to step 7 is repeated a predetermined number of times, a previous sine wave correction signal and a current sine wave correction signal may be synthesized to generate a new sine wave correction signal, as shown in FIG. 5. The new sine wave correction signal may be added to the torque instruction to generate a new torque instruction. After the correction operation is executed first (step 8), the correction processing unit 5 extracts an order component having the largest spectrum from order components extracted by repeating the same operation and excluding the previously extracted order component having the largest spectrum (step 9). The correction processing unit 5 synthesizes the previous sine wave correction signal and the current sine wave correction signal to generate a new sine wave correction signal (step 10).

Figure 3:
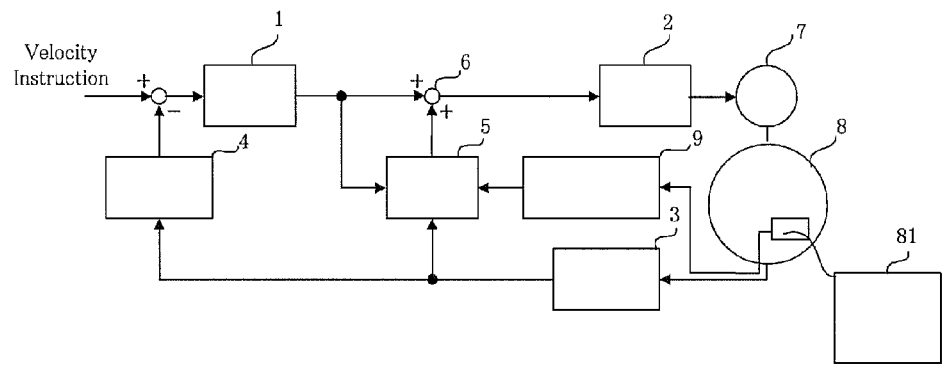
FIG. 3 is a block diagram showing a configuration of a motor controller and a motor according to a second embodiment of the invention.

FIG. 3 is a block diagram showing a configuration of a motor controller and a motor according to a second embodiment of the invention.

The motor controller includes a sine-wave-correction-signal storage unit 9. The sine-wave-correction-signal storage unit 9 stores sine wave correction signals of first- and second-order components for the electric angle of the motor controller, and stores a sine wave correction signal of a sixth-order component caused by the motor 7.

The motor 7 including the position detector 8 includes a sine-wave-correction-signal storage unit 81 in the position detector 8. The sine-wave-correction-signal storage unit 81 stores the sixth-order sine wave correction signal caused by the motor 7.

The motor controller outputs a reading command for the sine wave correction signal to the position detector 8 when power is turned on or depending on its necessity. The motor controller can read the data stored in the sine-wave-correction-signal storage unit 81, store the read data in the sine-wave-correction-signal storage unit 9 in the motor controller, and write new data in the sine-wave-correction-signal storage unit 81 in response to a writing command of the sine wave correction signal.

While the rotary motor has been described in the first and second embodiments, the configuration of the invention can be applied to a linear motor by replacing the motor with a linear motor, and the torque with a thrust.

The motor controller only corrects the first- and second-order components caused by the motor controller and the sixth-order component caused by the motor. High-precision torque ripple correction can be provided. The motor controller can be applied to, for example, machine tools, general industrial machines, and robots, which require high-precision position control.

The motor controller of the invention corrects not all first- to m-th-order components by Fourier-transforming a torque ripple component, but corrects only the first-, second-, and sixth-order components mainly caused by the torque ripple. Thus, an accurate sine wave correction signal can be obtained without being affected by other order components.

Also, since the sine wave correction signal is stored in an EEPROM of the motor controller and an EEPROM of the position detector of the motor, correction information and phase information of the components caused by the motor and the motor controller can be stored. Hence, even when the combination of the motor and the motor controller is changed, accurate correction can be provided so as to fit each of the motor and the motor controller.

What is claimed is:

1. A motor controller to drive a motor including a position detector, the motor controller comprising:
   a position-signal generation unit configured to generate a position signal based on a position detection signal detected by the position detector;
   a velocity control unit which generates a torque instruction by using a velocity instruction and a velocity signal;
   an electrical-angle generation unit configured to generate an electrical angle by using the position detection signal;
   a trace unit configured to store the torque instruction and the electrical angle for a given period;
   a Fourier transform unit configured to Fourier-transform the stored torque instruction and configured to extract only a first- and a second-order frequency components caused by the motor controller and a sixth-order frequency component caused by the motor among frequency components including in the Fourier-transformed torque instruction;
   an order-component extraction unit configured to extract an order component having a largest spectrum from the first-, second-, and sixth-order frequency components extracted by the Fourier transform unit;
   a correction-signal generation unit configured to generate a sine wave correction signal by inverse-Fourier-transforming the torque instruction of the order component extracted by the order-component extraction unit;
   an adder which adds the sine wave correction signal to the torque instruction, and generates a new torque instruction;
   a motor drive unit configured to supply power to a motor based on the new torque instruction; and
   a first sine-wave-correction-signal storage unit configured to store the sine wave correction signals generated by inverse-Fourier-transforming the torque instruction of each of the first- and the second-order frequency components and configured to store the sine wave correction signals generated by inverse-Fourier-transforming the torque instruction of the sixth-order frequency component.

2. The motor controller according to claim 1, wherein, after the correction-signal generation unit generates the previous sine wave correction signal, the order-component extraction unit extracts another order component having the largest spectrum from the extracted order components excluding the previously extracted order component having the largest spectrum, and a correction processing unit synthesizes the previous sine wave correction signal and the current sine wave correction signal.

3. The motor controller according to claim 1, wherein the sine-wave-correction-signal storage unit is configured to store the first- and second-order components of the Fourier-transformed torque instruction.

4. The motor controller according to claim 1, wherein the position detector includes a second sine-wave-correction-signal storage unit which stores the sixth-order component of the Fourier-transformed torque instruction.

5. The motor controller according to claim 1, wherein the position detector includes a second sine-wave-correction-signal storage unit configured to store only the sine wave correction signal generated by inverse-Fourier-transforming the torque instruction of the sixth-order frequency component.

* * * * *